United States Patent [19]

Vermeer

[11] Patent Number: 5,131,214
[45] Date of Patent: Jul. 21, 1992

[54] BALER FILL MONITOR

[75] Inventor: Gary J. Vermeer, Pella, Iowa

[73] Assignee: Vermeer Manufacturing Company, Pella, Iowa

[21] Appl. No.: 641,669

[22] Filed: Jan. 15, 1991

[51] Int. Cl.$^5$ .................. A01B 69/00; A01D 39/00; B62D 15/02
[52] U.S. Cl. ........................... 56/10.2; 56/341; 56/DIG. 15
[58] Field of Search ............... 56/341, 10.2, DIG. 15; 100/99, 49

[56] References Cited

U.S. PATENT DOCUMENTS

| | | |
|---|---|---|
| 4,726,175 | 2/1988 | Day et al. .................. 56/10.2 |
| 4,748,801 | 6/1988 | Sheehan et al. .................. 56/341 |
| 4,855,924 | 8/1989 | Stroesser et al. .................. 56/341 X |
| 4,918,441 | 4/1990 | Bohman .................. 56/DIG. 15 |
| 5,010,719 | 4/1991 | Korthuis .................. 56/10.2 |

Primary Examiner—Stephen J. Novosad
Attorney, Agent, or Firm—Kent A. Herink; Brian J. Laurenzo

[57] ABSTRACT

A crop loading monitor for a baler includes a two-state interval timer which signals an operator of the baler to position the baler so as to feed crop material preferentially alternately into one or the other side of the baler. A switch mounted on the wind guard of the baler interrupts the countdown of the interval timer when crop material is not entering the baler. The crop loading monitor can be used to control a self-steering baler.

18 Claims, 2 Drawing Sheets

BALER FILL MONITOR

BACKGROUND OF THE INVENTION

The invention relates to monitor systems for agricultural equipment, and, more specifically, to a monitor system for assisting in the formation of large cylindrical bales of a substantially uniform diameter over their length.

Balers for the formation of large, cylindrical bales of crop material are well known and widely used throughout the agricultural industry. The bales, which typically are six feet in diameter and five feet long, are formed inside a tractor-drawn baler which picks up windrowed crop material off of the ground. The crop material is fed into a baling chamber formed by a plurality of endless belts which roll the crop material into the large cylindrical bales.

Important to the formation of bales of uniform diameter is a substantially even distribution of crop material over the entire width of the baler. If the windrow is other than substantially the full width of the baler and of uniform height across the width of the windrow, crop material may be nonuniformly distributed across the length of the bale, resulting in uneven bales. For example, if the windrow is narrower than the baler and is fed down the center of the crop pick up of the baler, a barrel-shaped bale may result. If crop material was fed into one side of the baler preferentially over the other side of the baler, a bale having a conical section may result.

An approach that has been taken to make the bales of a more uniform diameter is to drive the baler to direct crop material alternately to the opposite sides of the crop pick up means. For example, by driving a sinusoidal path the crop material will be directed to both ends of the bale as well as to the middle of the bale. Accordingly, bale monitors have been developed which direct the operator of the baler to drive the baler in a pattern which will result in uniform bales. For example, U.S. Pat. Nos. 4,517,795 and 4,224,867 teach a pair of sensor arms which ride on one of the endless belts at either side of the baler. The sensor arms are connected to a monitor box mounted adjacent the operator. The monitor box detects when belt tension at one side of the baler is greater than the other side and directs the operator to steer the baler to add crop material to the side of the baler where belt tension is less.

Another system is described in U.S. Pat. No. 4,742,768 where a belt tensioning arm, which pivots as the forming bale increases in diameter, controls a monitor that is responsive to changes in bale diameter. The monitor is mounted near the operator and will direct the operator to steer the baler so as to add crop material to an opposite side of the baler alternately in correspondence with predetermined movement of the arm.

Yet another patent, U.S. Pat. No. 4,702,066, describes a pair of belt tension sensing arms located at either side of the baler for monitoring the belt tension in the endless belts at the end portions of the forming bale. When the belt tension at one end of the baler substantially exceeds that at the other end, a signal is sent to a control system for steering the wheels of the baler to direct the baler so that crop material preferentially fills the side of the baler with less belt tension. No action is required of the operator, as the baler itself weaves to assure that a bale of uniform diameter is formed.

Existing bale monitor systems, accordingly, either monitor the relative tension in belts located of the baler to infer bale diameter at either end of the forming bale, or they monitor directly the bale diameter at either end of the forming bale. In the present invention, a system for monitoring the volume of crop material entering the baler includes an interval timer of adjustable period which controls a monitor box mounted near the operator. The monitor box signals to the operator to direct crop material to alternate sides of the baler, oscillating from one side to the other at a preselected, adjustable time interval. The timer is interrupted during periods in which crop material is not entering the baler so that the monitor system is responsive to the volume of crop material entering the baler. In a second preferred embodiment, the timer controls a system for steering directly the wheels of the baler. According to the present invention, no actual sensing or measurement of bale diameter or belt tension is made.

SUMMARY OF THE INVENTION

An object of the present invention is to provide a monitor for a baler of large cylindrical bales which will direct an operator to steer the baler so as to distribute crop material uniformly to create a bale having a substantially uniform diameter across its length.

Another object of the present invention is to provide a bale monitor system which does not depend on monitoring of the diameter of the forming bale.

Yet another object of the present invention is to provide a bale monitor system which is independent of the belt tension of the baler during formation of the bale.

Still another object of the invention is to provide a bale monitor system which effectively measures the rate of crop volume flow into the baler.

A further object of the invention is to provide a bale monitor system which utilizes an interval timer of adjustable period preselected in response to the volume of crop material in a windrow being baled.

Yet a further object of the invention is to provide a bale monitor system which is used as a steering guide to direct the operator of the baler to feed crop material into alternating sides of the crop pick up mechanism at a regular frequency that is preselected in response to the volume of the windrow being baled.

Still a further object of the invention is to provide an interval timer that is interrupted during periods when crop material is not entering the baler.

Yet another object of the invention is to provide an interruption in the steering guide to indicate the automatic initiation of bale formation.

Still another object of the invention is to provide a bale monitor system, including an interval timer, which controls a system for directly positioning the baler independent of operator response.

These and other objects of the invention will be evident from the following detailed description of a preferred embodiment.

DETAILED DESCRIPTION OF A PREFERRED EMBODIMENT

Figure 1:
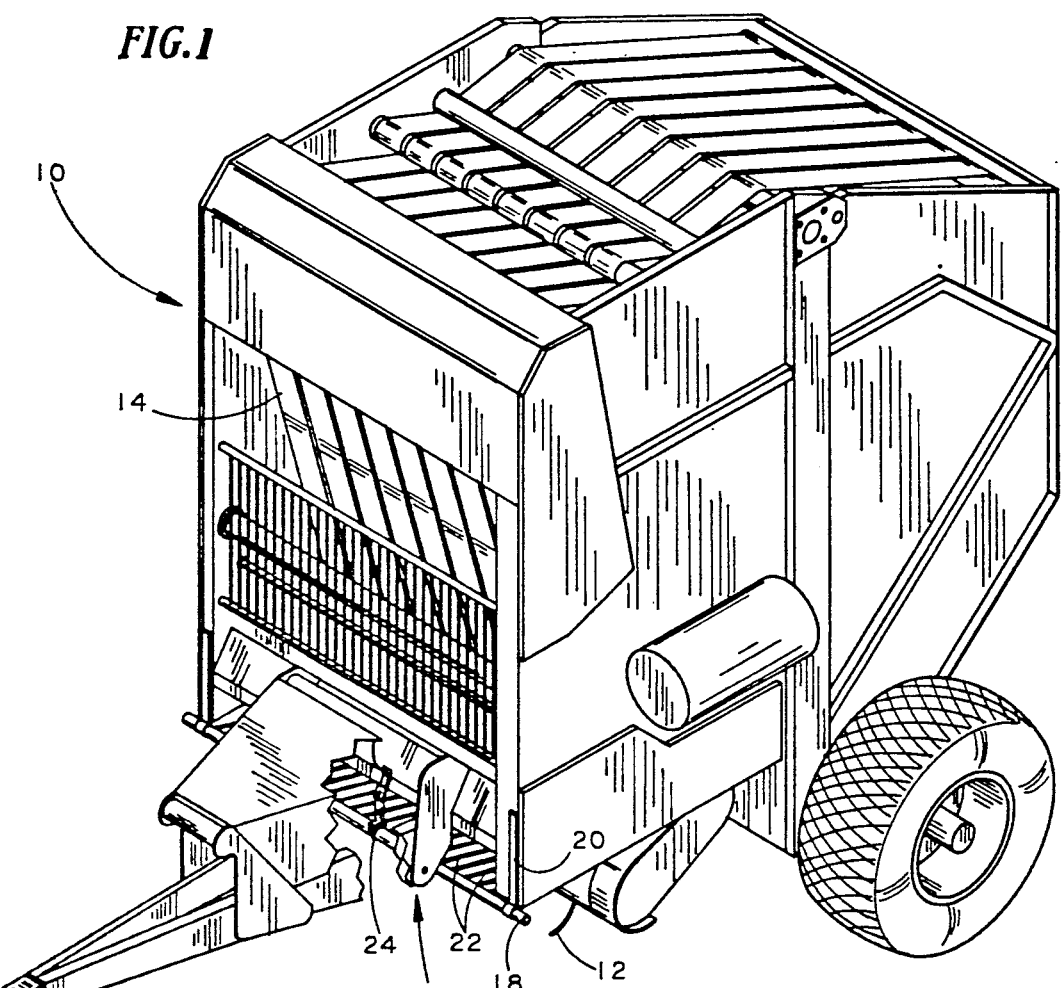
FIG. 1 is a front perspective view of a baler of large, cylindrical bales on which the bale monitor system of the present invention has been mounted.

Illustrated in FIG. 1, generally at 10, is a ground-supported baler for forming large, cylindrical bales of crop material. The baler 10 is pulled across the ground by a tractor (not shown). Crop material is picked up by the plurality of tines 12 which form a part of the crop pick up mechanism of the baler 10. The tines 12 pick up the windrow of crop material and move it upwardly and rearwardly into a baling chamber of the baler formed by a plurality of endless belts 14 which are uniformly spaced across the width of the baler 10.

Figure 2:
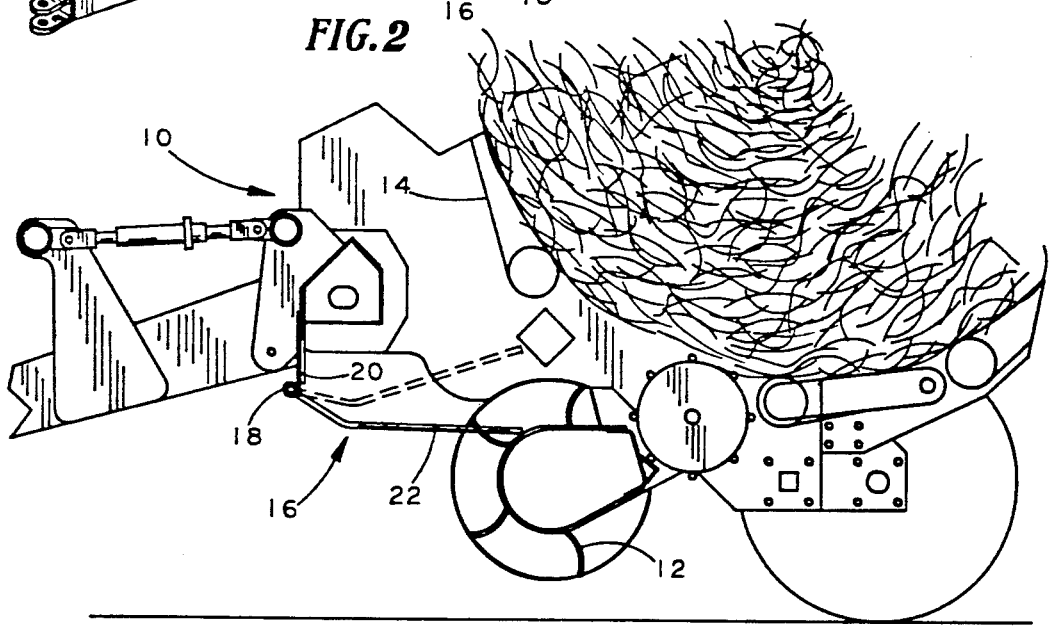
FIG. 2 is a partial side view of the baler.

Spanning the width of the baler and located proximate to and above the crop pick up mechanism is a wind guard, indicated generally at 16. The wind guard 16 includes a transversely extended cross tube 18 that is mounted for pivotal movement at either end portion thereof to a frame portion 20 of the baler 10. Mounted to the wind guard cross tube 18 are a plurality of compression tines 22 that extend rearwardly from their attachment points to the pivotable rod 18 and which extend rearwardly toward the crop intake of the baler 10. The wind guard 16 has a lowermost position, as illustrated in FIGS. 1 and 2, which is assumed when no crop material is entering the baler 10. When crop material is entering the baler 10, the wind guard 16 rides on top of the web of crop material being picked up by the baler 10 and serves to somewhat compress and transversely distribute the crop material. When crop material is entering the baler 10, accordingly, the wind guard 16 will pivot upwardly from its lowermost position and ride atop the crop material being collected, the maximum upper position being illustrated in broken line in FIG. 2. The wind guard 16 will ride atop the crop material with the result that its angular position will be varying over time in a continuous fashion responsive to the typical nonuniformity of the crop material entering the baler 10. If the rate of flow of crop material into the baler is small, the wind guard 16 will spend much of the time at angular positions nearer to the lowermost position. In contrast, if the rate of flow of crop material into the baler is large, the wind guard 16 will spend relatively more of the time at angular positions near to the uppermost position. Under virtually all crop conditions, however, the wind guard will move to both of the extreme positions at times. If the windrow terminates or if the forward motion of the baler is stopped, such that crop material is no longer entering the baler 10, the wind guard 16 will pivot to return to its lowermost position.

Figure 3:
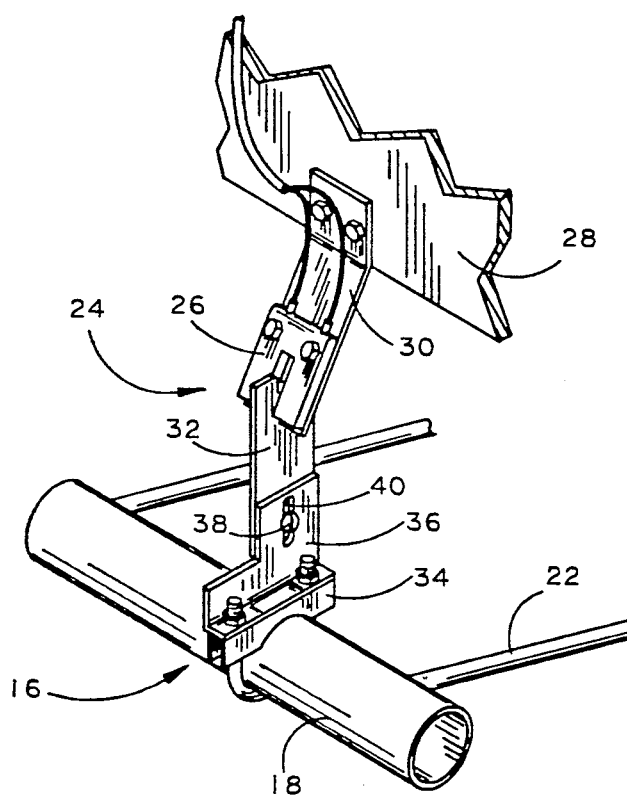
FIG. 3 is an enlarged detail perspective view of a sensor for monitoring the entry of crop material into the baler and which is mounted on the wind guard of the baler.
Figure 4:
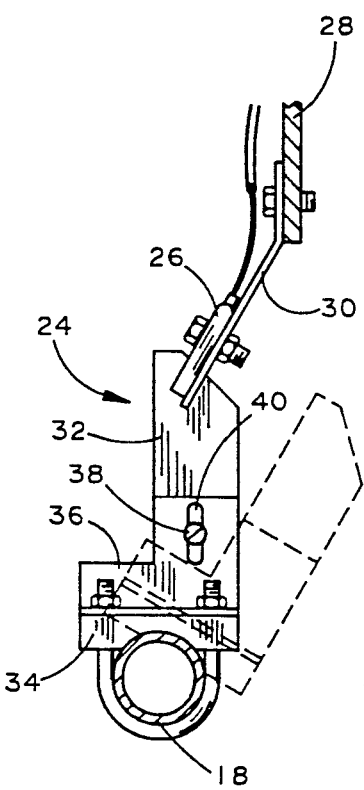
FIG. 4 is a side view of the sensor illustrated in FIG. 3.

A wind guard sensor 24 (FIGS. 1, 3 & 4) is associated with the wind guard 16 to monitor crop material entering the baler 10. A magnetic reed switch 26 is suspended above the wind guard cross tube 18 from a transverse bar 28 of the baler frame by a mounting strap 30. A ferrous flag 32 is mounted for pivotal movement with the wind guard 16 by way of a U-shaped muffler clamp 34 and flag mount 36. The U-shaped muffler clamp 34 is secured to the wind guard cross tube 18 and has secured to it the flag mount 36. The flag 32 is attached to the flag mount 36 by a nut and bolt combination 38. An elongated bolt slot 40 of the flag mount 36 permits adjustment of the radial position of the flag 32 relative to the wind guard cross tube 18.

The flag 32 is held outside of the magnetic reed switch 26 when the wind guard 16 is in its lowermost position. When a sufficient volume of crop material is entering the baler, the wind guard 16 will be moved upwardly thereby pivoting the wind guard cross tube 18 and flag 32 inside of the magnetic reed switch 26 to the position shown by solid line in FIG. 4. In this position, the flag 32 is inside of the magnetic reed switch 26 which, accordingly, changes state from the position illustrated in broken line in FIG. 4 so that the magnetic reed switch 26 senses whether or not crop material is entering the baler.

The wind guard sensor 24 is a two-state sensor that is in one state when the wind guard 16 is below a preselected angular position and in the other state when the wind guard 16 is above said position. As discussed above, the wind guard 16 will move the sensor 24 between its two states in response to the flow of crop material into the baler. When the rate of flow is large, the sensor 24 will be in a first of its states a relatively large amount of time. When the rate of flow is small, the sensor 24 will be in its second state a relatively large amount of time. Accordingly, the amount of time the sensor 24 is in the first state will be proportional to the rate of flow of crop material into the baler.

Figure 5:
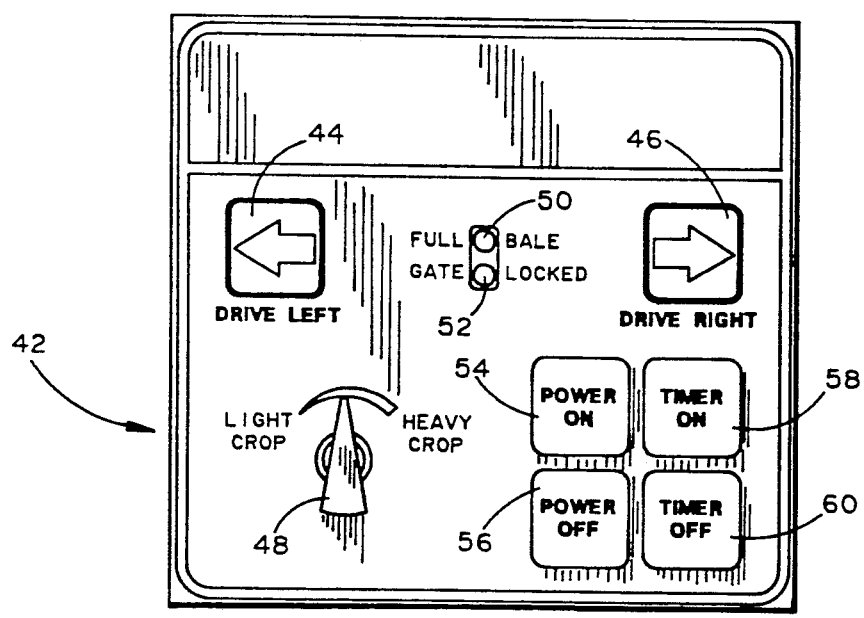
FIG. 5 is a diagrammatic view of the face panel of the monitor which forms a part of the present invention.

FIG. 5 illustrates a face panel 42 of a bale monitor that is located on the tractor within the view of the operator of the baler 10. The monitor has electronic circuitry which includes a two-state interval timer that controls a pair of indicator lights, "Drive Left" indicator light 44 and "Drive Right" indicator light 46. The interval timer alternates between two states, a first state in which the "Drive Left" indicator light 44 is illuminated and a second state in which the "Drive Right" indicator light 46 is illuminated. The base period or frequency of alternation between changes in which indicator light is illuminated is adjustable by a crop volume potentiometer 48. If the windrow being baled is relatively light, the potentiometer 48 is turned in the counterclockwise direction. If the windrow being baled is relatively heavy, the potentiometer 48 is turned in the clockwise direction. The potentiometer 48 is adjusted so that the frequency with which the indicator lights 44 and 46 change increases with increasing clockwise position of the potentiometer 48.

In the preferred embodiment, the operator drives the tractor under the direction of the indicator lights 44 and 46. Accordingly, if the "Drive Left" indicator light 44 is illuminated, the operator steers the tractor to the left so that crop material is preferentially received in the right-hand side of the baler. When the interval timer changes state, a buzzer sounds for one-half second, the "Drive Right" indicator light 46 is illuminated and the operator will drive right until the crop material is being received preferentially in the left-hand side of the baler. The path of the baler is, therefore, roughly oscillatory with dwell times alternating between right and left sides and transition sections where the baler is steered from one side to the other. If the windrow is relatively light, containing a relatively smaller amount of crop material per length, the formation of a uniform diameter bale permits a longer dwell time at either side of the baler. The period of the interval timer, accordingly, is relatively longer when the windrow is light. When the windrow is heavy, containing a larger volume of crop material per length, it is preferred to have a shorter amount of dwell time at either side of the baler so that the frequency of oscillation of the position of the baler is faster to result in a more uniform bale diameter.

The monitor also includes a "Full Bale" indicator light 50 and a "Gate Locked" indicator light 52. The "Full Bale" indicator light 50 illuminates when a sensor on the baler changes state to indicate that the bale is fully formed inside the baling chamber so that the operator knows to stop the forward motion of the tractor and to discharge the fully formed bale. The "Gate Locked" indicator light 52 illuminates when the tail gate, which has been opened to discharge the fully formed bale, has been returned to its closed and locked position so that formation of a new bale can begin. Upon return of tail gate to the locked position, the monitor resets the steering control cycle. The interval timer does not begin until the sensor 24 has changed state to indicate that crop material is entering the baler. At the end of the first cycle of the interval timer (which is dependent on the setting of the potentiometer 48), a buzzer sounds and the "Drive Right" indicator light 46 is illuminated. Operating instructions that accompany the baler direct the operator to begin a new bale by directing crop material into the right hand side of the baler and to immediately steer right to direct crop material into the left hand side of the baler and then back again, an operation that typically takes about 8 seconds, whereafter the "Drive Right" indicator light 46 will illuminate and the steering is under control of the circuitry as described above. The monitor also includes a power-on switch 54 and a power-off switch 56 for the usual purposes. The interval timer is controlled by a timer-on switch 58 and a timer-off switch 60 to allow the operator to extinguish the indicator lights 44 and 46 when the windrow width is substantially equal to the width of the baling chamber such that a uniform bale will be formed without side-to-side driving of the baler.

The monitor system is also controlled by the wind guard sensor 24. When the wind guard 16 is in its lowermost position, as it is when no crop material is entering the baler, the magnetic reed switch 26 interrupts the interval timer. The count down or cycling of the interval timer is resumed when crop material entering the baler pivots the wind guard cross tube 18 to move the flag 32 into the magnetic reed switch 26. In this way, the interval timer does not continue to run and alternate the drive left and drive right indicator lights 44 and 46 when no crop material is entering the baler. For example, when the end of a row is reached and the operator is turning the tractor and baler around to begin baling on a new row, no crop material may be entering the baler 10. Accordingly, the wind guard sensor 24 interrupts the interval timer so that when crop material again enters the baler, it will be directed to the appropriate side of the baler that was being filled when the interval timer was interrupted.

In a second preferred embodiment, the present invention is used in association with the baler self-steering system described in U.S. Pat. No. 4,702,066, which is incorporated herein in its entirety by this reference. The device described in the '066 patent can be simply modified by having the two-state interval timer control the priority relay (element 51 of the '066 patent), replacing the limit switches and the associated actuating arms.

It has been found that the period of the interval timer should be adjustable between a minimum period of about 5 seconds and a maximum period of about 15 seconds, with the preferred range being between 8 and 12 seconds. Even though the diameter of the forming bale is not directly monitored, or inferred by monitoring of belt tension, the present invention directs crop material to either side of the forming bale, as well as across the middle portion of the forming bale particularly during the transition periods, so that a bale of substantially uniform diameter results in a large variety of crop materials and baling conditions.

Although the invention has been described with respect to a preferred embodiment thereof, it is to be also understood that it is not to be so limited since changes and modifications can be made therein which are within the full intended scope of this invention as defined by the appended claims.

I claim:

1. A crop loading monitor for a tractor-drawn baler, comprising:
   (a) first and second steering signal means; and
   (b) an interval timer for generating a response in said steering signal means that alternates at a preset period between said first steering signal means and said second steering signal means.

2. A crop loading monitor as defined in claim 1, wherein said preset period of said interval timer is adjustable.

3. A crop loading monitor for a tractor-drawn baler of large cylindrical bales, comprising:
   (a) sensor means mounted on the baler changeable between a rest state and an operating state in response to crop material being fed into the baler;
   (b) first and second steering indicator means;
   (c) an interval timer for generating a signal in said steering indicator means that alternates between said first steering indicator means and said second steering indicator means; and wherein
   (d) said sensor means interrupts said interval timer when it is in said rest state.

4. A monitor as defined in claim 3, wherein said interval timer resumes operation when said sensor means changes to said operating state in response to crop material being fed into the baler.

5. A monitor as defined in claim 3, further comprising:
   (a) a wind guard mounted at the front of the baler for pivotal movement between a rest position and a raised position in response to crop material being fed into the baler; and
   (b) said sensor means is in said rest state when said wind guard is in said rest position and is in said operating state when said wind guard is in said raised position.

6. A monitor as defined in claim 3, wherein said interval timer alternates between two states with a period that is adjustable.

7. A monitor as defined in claim 3, wherein said first and second steering indicator means are mounted on the tractor.

8. A monitor as defined in claim 6, wherein said period is adjustable between five seconds for heavy crop conditions and 15 seconds for light crop conditions.

9. A crop loading monitor for a tractor-drawn baler that includes wheels steerable between a right position and a left position and means for steering the wheels, the monitor comprising:
   (a) first and second steering signal means operatively associated with the means for steering the wheels; and (b) a two-state interval timer responsive to the volume of crop material entering the baler for controlling said steering signal means that alternates between said first steering signal means and said second steering signal means whereby the wheels are steered alternately between the right and left position in response to changes in state of said interval timer.

10. A crop loading monitor for a tractor-drawn baler that includes means for steering of the baler, the monitor comprising:
   (a) steering signal means operatively associated with the baler steering means; and
   (b) a two-state interval timer responsive to the volume of crop material entering the baler for controlling said steering signal means to steer the baler alternately between a right and left position in response to changes in state of said interval timer.

11. A method of forming in a baler bales of crop material, comprising the steps of:
   (a) running a two-state interval timer;
   (b) generating a signal in a first steering indicator means by said interval timer when in a first state thereof;
   (c) positioning the baler to feed crop material preferentially into one side of the baler as indicated by said first steering indicator means;
   (d) changing of state of said two-state interval timer in response to the passage of the time interval of said timer;
   (e) generating a signal in a second steering indicator means by said interval timer in a second state thereof; and
   (f) repositioning the baler to feed crop material preferentially into an opposite side of the baler as indicated by said second steering indicator means.

12. A method of forming in a self-steerable baler bales of crop material, comprising the steps of:
   (a) running a two-state interval timer;
   (b) generating a control signal in said interval timer when in a first state thereof so as to steer the baler to direct crop material preferentially into a first side of the baler;
   (c) changing the state of said interval timer in response to an amount of crop material that has entered the baler; and
   (d) generating a control signal in said interval timer when in said second state thereof so as to steer the baler to direct crop material preferentially into a second side of the baler.

13. A method of forming in a baler bales of crop material, comprising the steps of:
   (a) providing a controller for alternately activating a first and a second steering signal means, which initially activates said first steering signal means;
   (b) positioning the baler to feed crop material preferentially into a first side of the baler;
   (c) generating a signal in a sensor mounted on the baler which is responsive to the volume of crop material entering the baler;
   (d) monitoring said signal in said controller to activate said second steering signal means in response to a predetermined volume of crop material entering the baler; and
   (e) positioning the baler to feed crop material preferentially into a second side of the baler.

14. The method of claim 13 wherein said controller is a two-state interval timer.

15. A method of forming in a self-steerable baler bales of crop material, comprising the steps of:
   (a) providing a controller for alternately activating a first and a second steering signal means, which initially activates said first steering signal means so as to steer the baler to direct crop material preferentially into a first side of the baler;
   (b) generating a signal in a sensor mounted on the baler which is responsive to the volume of crop material entering the baler; and
   (c) monitoring said signal in said controller to activate said second steering signal means in response to a predetermined volume of crop material entering the baler so as to steer the baler to direct crop material preferentially into a second side of the baler.

16. The method of claim 15 wherein said controller is a two-state interval timer.

17. A crop loading monitor for a tractor-drawn baler of large cylindrical bales, comprising:
   (a) sensor means mounted on the baler for generating a signal which is proportional to the volume of crop material being fed into the baler;
   (b) first and second steering indicator means;
   (c) a control means for generating a signal in said steering indicator means that alternates between said first steering indicator means and said second indicator means; and wherein
   (d) the alternating of the steering indicator means is proportional to the volume of crop material being fed into the baler.

18. The monitor of claim 17 wherein said control means is a two-state interval timer.

* * * * *